United States Patent
Takahashi

(10) Patent No.: US 8,804,750 B2
(45) Date of Patent: Aug. 12, 2014

(54) FIELD DEVICE

(75) Inventor: Seiichiro Takahashi, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 660 days.

(21) Appl. No.: 12/630,909

(22) Filed: Dec. 4, 2009

(65) Prior Publication Data

US 2010/0145478 A1 Jun. 10, 2010

(30) Foreign Application Priority Data

Dec. 5, 2008 (JP) .................................. 2008-310931

(51) Int. Cl.
- *H04L 12/28* (2006.01)
- *H04L 12/56* (2006.01)
- *H04L 25/00* (2006.01)
- *H04L 27/00* (2006.01)
- *G06F 13/42* (2006.01)
- *G06F 13/14* (2006.01)

(52) U.S. Cl.
USPC ............ 370/403; 375/216; 710/105; 710/305

(58) Field of Classification Search
None
See application file for complete search history.

(56) References Cited

U.S. PATENT DOCUMENTS

| | | | |
|---|---|---|---|
| 7,246,194 B2* | 7/2007 | Train et al. ..................... | 710/311 |
| 2003/0023795 A1* | 1/2003 | Packwood et al. ............ | 710/105 |
| 2003/0056043 A1 | 3/2003 | Kostadinov | |
| 2003/0236937 A1* | 12/2003 | Barros De Almeida et al. ............................. | 710/305 |
| 2005/0232305 A1 | 10/2005 | Lindemann | |
| 2008/0151973 A1* | 6/2008 | Calvin .......................... | 375/216 |

OTHER PUBLICATIONS

Extended European Search Report for Application No. 09177811.8-2416, dated Feb. 9, 2010.

* cited by examiner

*Primary Examiner* — Hassan Phillips
*Assistant Examiner* — Lonnie Sweet
(74) *Attorney, Agent, or Firm* — Sughrue Mion, PLLC

(57) ABSTRACT

There is provided a field device performing a communication through a communication line. The field device includes: first circuits involved with a smart communication; second circuits involved with a fieldbus communication; a token detecting circuit that detects a token in the fieldbus communication; and a control circuit. The control circuit is operable to: i) cause the second circuits to operate when the token is detected within a given time by the token detecting circuit; and ii) cause the second circuits not to operate when the token is not detected within the given time by the token detecting circuit.

5 Claims, 5 Drawing Sheets

FIELD DEVICE

This application claims priority from Japanese Patent Application No. 2008-310931, filed on Dec. 5, 2008, the entire contents of which are incorporated by reference herein.

TECHNICAL FIELD

The present disclosure relates to a field device performing a communication through a communication line.

RELATED ART

Normally, a hardware design of the field device is based on its output mode. For example, a hardware configuration is widely different between the two-wire type field device whose output is in proportion to a current consumption and the bi-directional digital communication equipment typified by FOUNDATION Fieldbus (FF; trademark) or Profibus PA (see e.g., US2005/0232305 A1).

Like FOUNDATION Fieldbus (FF; trademark) and Profibus PA, when the specification of the physical layer is identical and a transmission speed is equal, the approach of selecting a communication system by checking the frame contents upon starting the power supply has been proposed. However, from the vender's viewpoint of the field device, there are problems such as:

(1) various different types of hardwares must be developed;
(2) a developing efficient is lowered because the management of the developed software are needed;
(3) the stock control in a manufacturing factory are needed; and
(4) the management of stock and spare parts in the factory becomes troublesome from the user's viewpoint.

Also, when the fieldbus device is mistakenly connected instead of the two-wire type field device in exchanging the device, the system may be badly affected. For example, since a current consumption of the fieldbus device is always about 10 mA to 15 mA, it is possible that the signal is misread as the 4-20 mA signal and the influences on the system are feared.

That is, in the fieldbus device, the transmission speed thereof is high (about 31.25 Kbps) and is largely different from the transmission speed (about 1200 bps) that is superposed on the signal line in the 4-20 mA type two-wire transmitter. As a result, a current consumption of about 10 mA or more is required in the fieldbus device. In contrast, the conventional 4-20 mA type two-wire transmitter such as HART must be operated under the current consumption of about 4 mA or less. Therefore, basic designs of both devices are different from each other in light of the current consumption.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an illustrative aspect of the present invention to provide a field device capable of responding to various output modes easily and safely.

According to one or more illustrative aspects of the present invention, there is provided a field device performing a communication through a communication line. The field device includes: first circuits involved with a smart communication; second circuits involved with a fieldbus communication; a token detecting circuit that detects a token in the fieldbus communication; and a control circuit. The control circuit is operable to: i) cause the second circuits to operate when the token is detected within a given time by the token detecting circuit; and ii) cause the second circuits not to operate when the token is not detected within the given time by the token detecting circuit.

According to the present invention, the communication mode is switched depending on whether or not the token is detected within a given time. As a result, the field device can respond to plural output modes easily and safely.

DETAILED DESCRIPTION OF EXEMPLARY EMBODIMENTS

Exemplary embodiments of the present invention will be now described with reference to FIG. 1 to FIG. 3B.

Figure 1A:
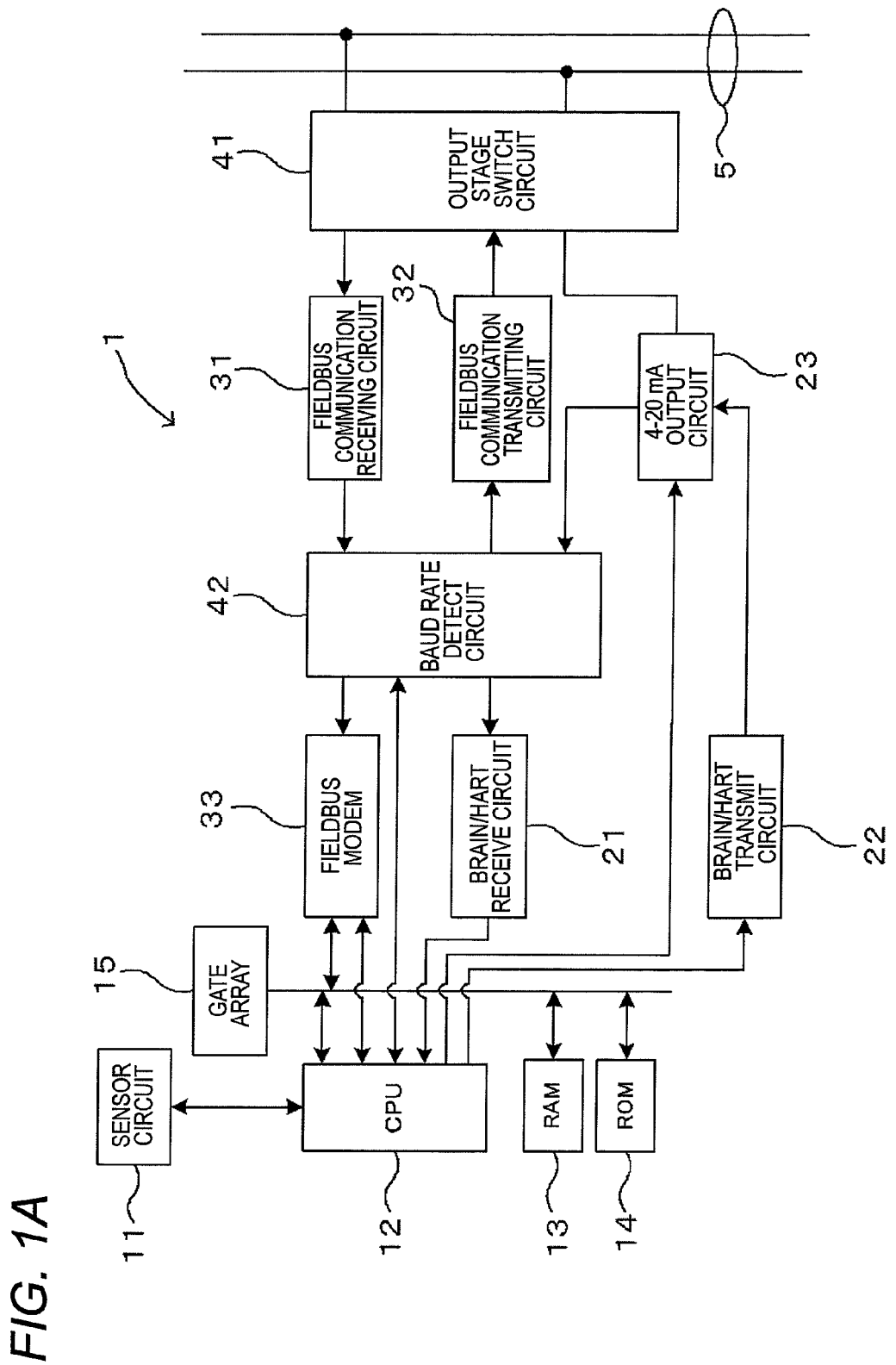
FIG. 1A is a block diagram showing a configuration of a field device according to an exemplary embodiment of the present invention.
Figure 1B:
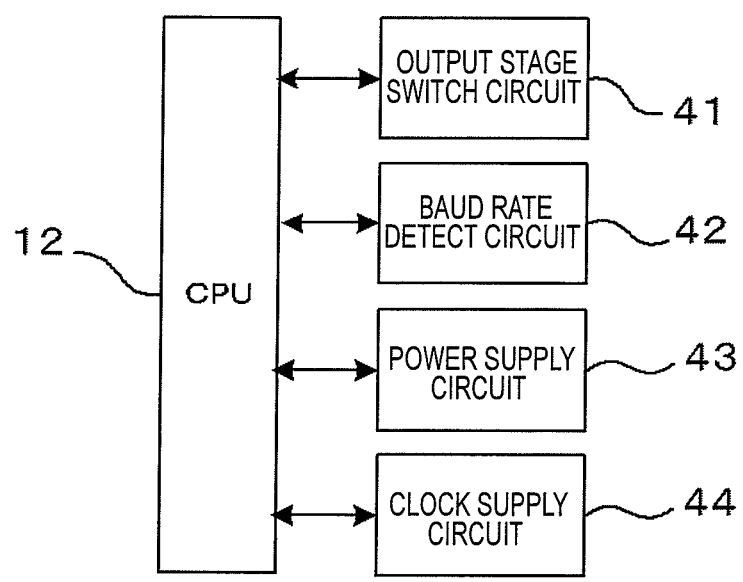
FIG. 1B is a block diagram showing a control system for switching a function of the field device shown in FIG. 1A.

FIG. 1A is a block diagram showing a configuration of a field device 1 according to an exemplary embodiment of the present invention, and FIG. 1B is a block diagram showing a control system for switching a function of the field device 1.

As shown in FIG. 1A, the field device 1 includes: a sensor circuit 11 for providing a sensor function of the field device 1, and a CPU 12 for executing the overall control of the field device 1. The field device 1 further includes: a RAM 13; a ROM 14; and; a gate array 15 in which logical circuits such as an address decoder, an external watchdog timer are built. Also, the RAM 13, the ROM 14 and the gate array 15 are connected to the CPU 12, respectively.

Also, as the elements for the two-wire type transmission system, the field device 1 further includes: a BRAIN/HART receive circuit 21; a BRAIN/HART transmit circuit 22; and a 4-20 mA output circuit 23, which can cope with the lower-speed smart communication (e.g., BRAIN communication, HART (registered trademark) communication).

Meanwhile, as the elements for the fieldbus transmission system, the field device 1 further includes: a fieldbus communication receiving circuit 31; a fieldbus communication transmitting circuit 32; and a fieldbus modem 33, which can cope with the high-speed fieldbus communication.

The field device 1 further includes: an output stage switch circuit 41 for switching a connection state with respect to a bus 5; and a baud rate detect circuit 42 for detecting presence/absence of the communication signal on the bus 5 and a transmission speed. The field device 1 further includes: a power supply circuit 43 for supplying an electric power to respective circuits (elements) of the field device 1; and a clock supply circuit 44 for supplying a clock signal to respective circuits (elements) of the field device 1 (see FIG. 1B). A clock frequency of the clock supply circuit 44 can be switched in response to the transmission speed.

As shown in FIG. 1B, the output stage switch circuit 41, the baud rate detect circuit 42, the power supply circuit 43, and the clock supply circuit 44 are connected to the CPU 12, respectively. The function of the field device 1 is selected by controlling the output stage switch circuit 41, the power supply circuit 43, and the clock supply circuit 44 in response to the result detected by the baud rate detect circuit 42.

Then, respective steps of selecting the function of the field device 1 will be now described.

Figure 2:
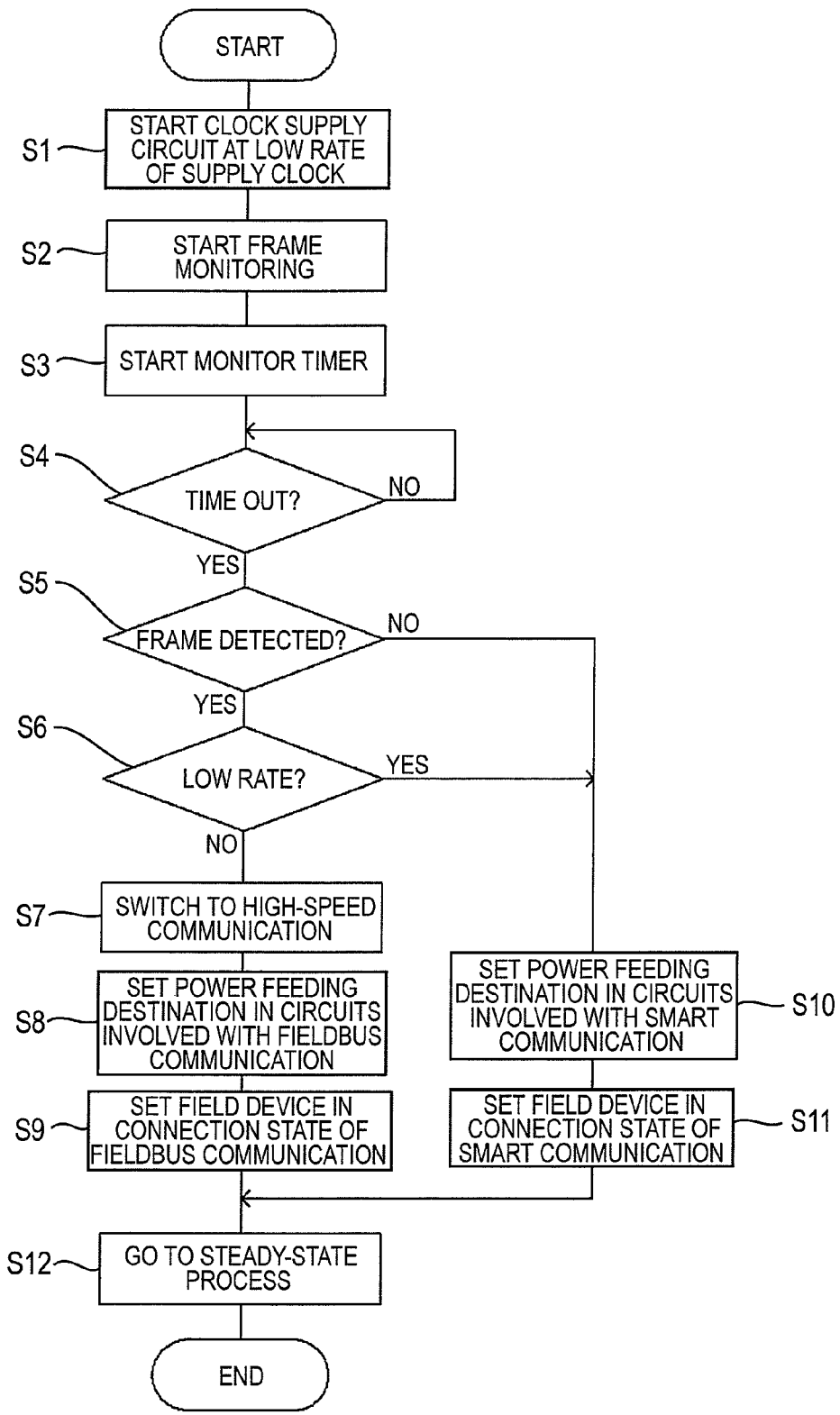
FIG. 2 is a flowchart showing steps of selecting the function of the field device according to the exemplary embodiment.

FIG. 2 is a flowchart showing steps of selecting the function of the field device 1. The respective steps are executed when the field device 1 is started under control of the CPU 12.

At Step S1 of FIG. 2, as the initial setting, a supply clock supplied from the clock supply circuit 44 is set to a frequency corresponding to the smart communication whose transmission speed is low. This is because an overall power consumption is increased when the supply clock is set to a high frequency corresponding to the fieldbus communication. As a result, there is possibility that the 4-20 mA signal acting as the main output signal is badly influenced when the signal superposed on the power supply line is the smart communication.

Also, at Step S1, the CPU, the BRAIN/HART receive circuit 21, the BRAIN/HART transmit circuit 22, the 4-20 mA output circuit 23, the fieldbus communication receiving circuit 31, and the baud rate detect circuit 42 are selected as the destination of the electric power supplied from the power supply circuit 43. In order to suppress the current consumption, the electric power is not supplied the fieldbus communication transmitting circuit 32 and the fieldbus modem 33.

Then, at Step S2, it is detected whether or not the frame is present on the bus 5 by the baud rate detect circuit 42.

Then, at Step S3, a monitor timer for deciding a frame monitoring time (given time) is started. The frame monitoring time is set in light of the characteristics of the fieldbus communication and the smart communication. That is, since the bi-directional digital communication is employed in the fieldbus communication, the host device always transmits a token (e.g., probe node (PN) in the case of the FF device) onto the bus 5 as the frame so as to check the presence of the target device. By way of example, an interval in which the token is transmitted is set in order of several msec in the FF device. Also, even when the host device becomes silent due to any trouble, normally an interval is set within about 10 msec until the backup host device starts to transmit the frame such as Claim LAS. Accordingly, it can be decided that when the silent state is continued for e.g., 1 sec, the fieldbus communication is not held. Thus, the frame monitoring time of about 1 sec is an enough time.

Then, at Step S4, it is decided whether or not time of the monitoring timer runs out. The process goes to Step S5 immediately after time-out of the monitoring timer.

At step S5, it is decided whether or not the frame is detected within the monitoring time. The process goes to Step S6 if the frame is detected (YES), whereas the process goes to Step S10 if the frame is not detected (NO).

At Step S6, it is decided whether or not the frame detected by the baud rate detect circuit 42 corresponds to the smart communication. If the detected frame corresponds to the frame (token) of the smart communication, the process goes to Step 10. In contrast, if the frame detected by the baud rate detect circuit 42 corresponds to the frame (token) of the fieldbus communication, the process goes to Step 7.

At Step S7, the supply clock supplied from the clock supply circuit 44 is switched to a frequency corresponding to the fieldbus communication whose transmission speed is high.

Then, at Step S8, under control of the power supply circuit 43, a power supply to the circuits (elements) involved with the smart communication is stopped and a power is supplied to the circuits (elements) involved with the fieldbus communication, i.e., the baud rate detect circuit 42, the fieldbus communication receiving circuit 31, the fieldbus communication transmitting circuit 32, and the fieldbus modem 33. Then, at Step S9, the connection state with respect to the bus 5 is switched to the fieldbus communication under control of the output stage switch circuit 41.

Figure 3A:
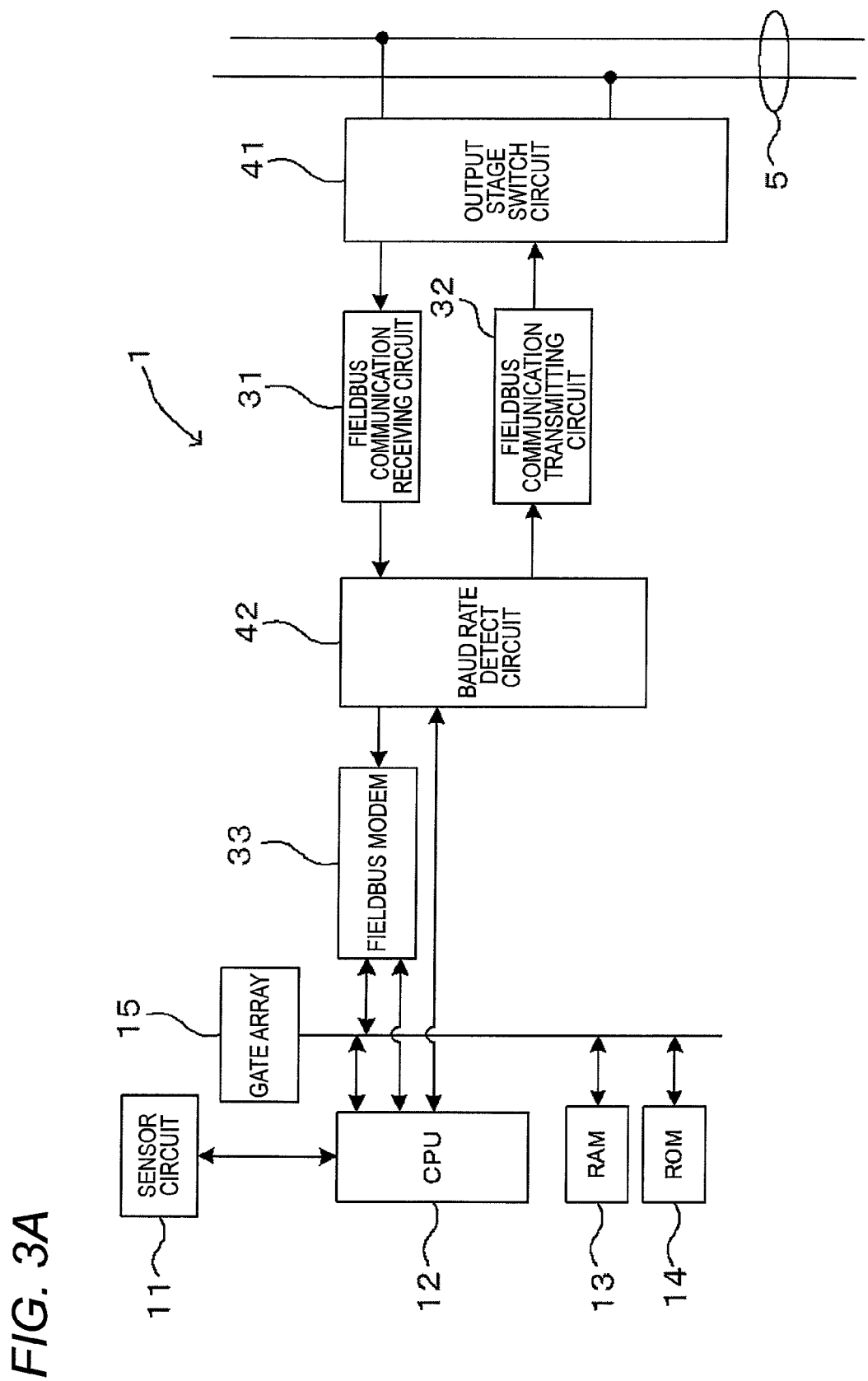
FIG. 3A is a block diagram showing the field device acting as a fieldbus device.

FIG. 3A is a block diagram showing an operation state of the field device 1 after the process of Step S8 is ended. Here, only the circuits (elements) involved with this operation state are extracted. In this manner, the field device 1 acts as the fieldbus device, and the process goes to the steady-state as the field device at Step S12 and the process for start-up of the field device 1 is ended.

In contrast, at step S10, under control of the power supply circuit 43, a power supply to the circuits (elements) involved with the fieldbus communication is stopped and a power is supplied to the circuits (elements) involved with the smart communication, i.e., the baud rate detect circuit 42, the BRAIN/HART receive circuit 21, the BRAIN/HART transmit circuit 22, and the 4-20 mA output circuit (first communicating means) 23. Then, at Step S11, the connection state with respect to the bus 5 is switched to the smart communication under control of the output stage switch circuit 41.

Figure 3B:
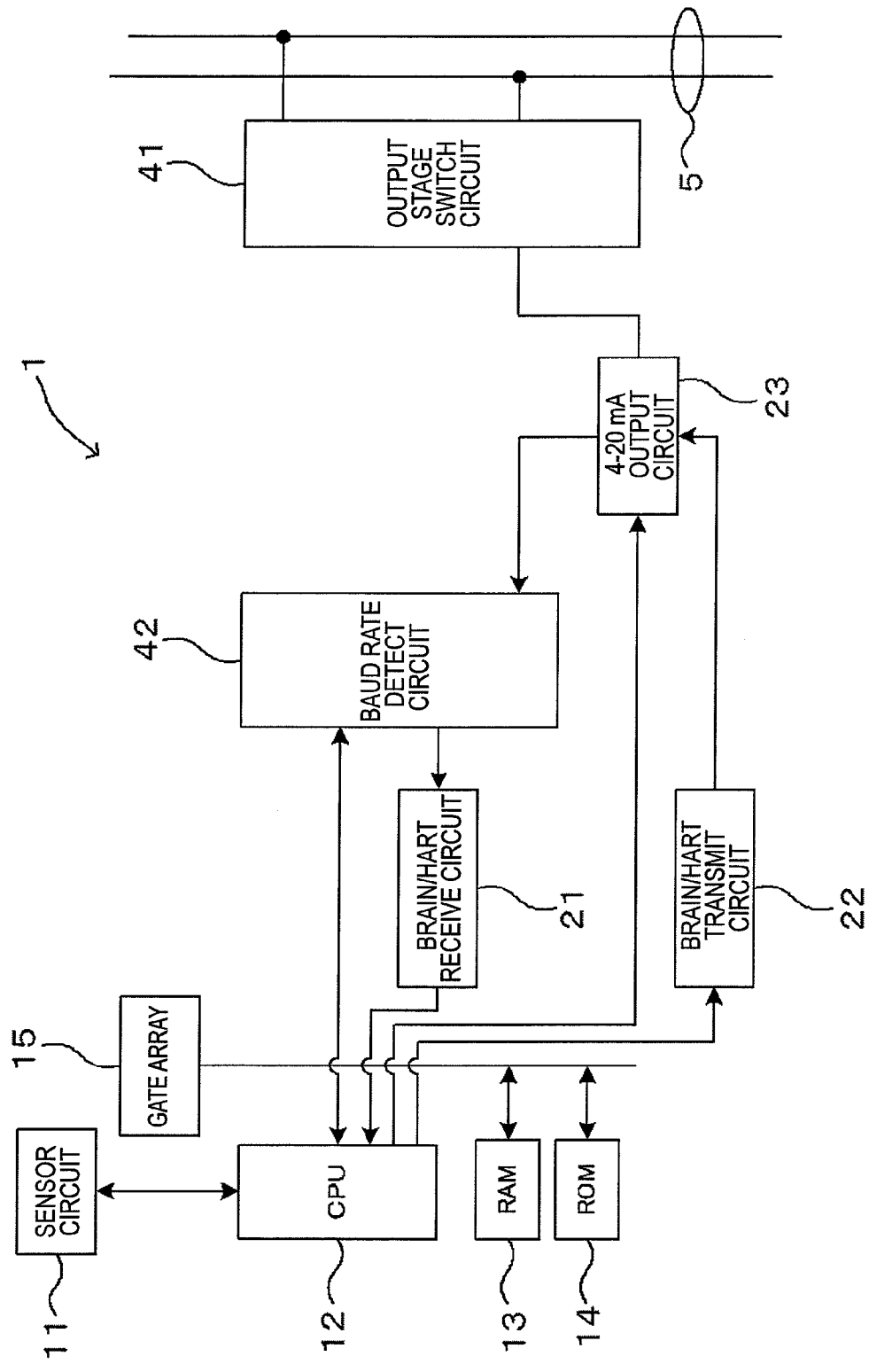
FIG. 3B is a block diagram showing the filed device acting as a two-wire type field device.

FIG. 3B is a block diagram showing an operation state of the field device 1 after the process of Step S11 is ended. Here, only the circuits (elements) involved with this operation state are extracted. In this manner, the field device 1 acts as the two-wire type field device, and the process goes to the steady-state as the two-wire type field device at Step S12 and the process for start-up of the field device 1 is ended.

As described above, the field device 1 of the exemplary embodiment can determine automatically either the fieldbus communication or the smart communication based on presence/absence of the frame on the bus 5 and the detected result of the baud rate. Also, the field device 1 can act as either of the fieldbus device or the two-wire field device. Therefore, not only the individual development required for the type of the field device is not needed, but also the troublesome operations such as the stock control are not needed.

Also, the power supply is applied only to the circuits (elements) required for the detection when the baud rate is detected. Also, the power supply is applied only to the necessary circuits (elements) depending on whether the field device 1 acts as the fieldbus device or the two-wire field device after the baud rate is detected. Accordingly, the overall power consumption can be suppressed, and the harmful influence on the system can be avoided.

In the exemplary embodiment, the FF bus is illustrated as the fieldbus. However, the exemplary embodiment is not limited thereto. For example, the present invention is also applicable to another fieldbus such as Profibus PA.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A field device performing a communication through a communication line, the field device comprising:
   first circuits involved with a smart communication;
   second circuits involved with a fieldbus communication;

a token detecting circuit that detects a token corresponding to a frame for the fieldbus communication;

a power supply for selectively providing power to the first circuits and the second circuits;

a control circuit coupled to the first circuits, the second circuits and the token detecting circuit, respectively, the control circuit:

i) causing the power from the power supply to be selectively provided to the second circuits and thereby causing the second circuits to operate and to prevent power from the power supply from being provided to the first circuits, when the token is detected within a given time by the token detecting circuit; and ii) causing the power from the power supply to be selectively provided to the first circuits and thereby cause the first circuits to operate and to prevent power from the power supply from being provided to the first circuits and thereby causing the second circuits not to operate when the token is not detected within the given time by the token detecting circuit or when a frame for the smart communication is detected within the given time by the token detecting circuit.

2. The field device according to claim 1, wherein the control circuit causes the first circuits to operate by selectively having the power supplied only to the necessary first circuits based on a detected baud rate, and wherein the control circuit causes the second circuits to operate by selectively having the power supplied only to the necessary second circuits based on a detected baud rate.

3. The field device according to claim 1, wherein a transmission speed of the smart communication is different from that of the fieldbus communication, and wherein the token detecting circuit detects the token based on a frame baud rate of the communication line.

4. The field device according to claim 1, wherein the field device acts as a fieldbus device when the second circuits are caused to operate, and wherein the field device acts as a two-wire field device when the first circuits are caused to operate.

5. The field device according to claim 3, wherein the transmission speed of the smart communication is lower than that of the fieldbus communication.

* * * * *